US012338112B2

(12) United States Patent
Linley

(10) Patent No.: US 12,338,112 B2
(45) Date of Patent: Jun. 24, 2025

(54) MAST AND GRAPPLE COMBINATION

(71) Applicant: Jason Linley, Fort St John (CA)

(72) Inventor: Jason Linley, Fort St John (CA)

(*) Notice: Subject to any disclaimer, the term of this patent is extended or adjusted under 35 U.S.C. 154(b) by 450 days.

(21) Appl. No.: 17/675,308

(22) Filed: Feb. 18, 2022

(65) Prior Publication Data

US 2022/0274818 A1 Sep. 1, 2022

(30) Foreign Application Priority Data

Feb. 19, 2021 (CA) ..................................... 3109696

(51) Int. Cl.
*B66F 9/18* (2006.01)
*B66F 9/08* (2006.01)

(52) U.S. Cl.
CPC . *B66F 9/08* (2013.01); *B66F 9/18* (2013.01)

(58) Field of Classification Search
CPC ... B66F 9/08; B66F 9/18; E02D 11/00; E02D 15/04; E04H 17/263; E04H 12/347; E04H 12/34; F16L 1/207
See application file for complete search history.

(56) References Cited

U.S. PATENT DOCUMENTS

| | | | | |
|---|---|---|---|---|
| 5,941,324 A * | 8/1999 | Bennett | E21B 19/14 175/85 |
| 8,235,104 B1 * | 8/2012 | Sigmar | E21B 19/164 166/85.1 |
| 2013/0140836 A1 * | 6/2013 | Niekamp | E02D 7/06 294/106 |
| 2016/0090707 A1 * | 3/2016 | Korherr | E02D 13/00 405/232 |
| 2019/0264411 A1 * | 8/2019 | Erhardt | E02F 3/96 |
| 2022/0275662 A1 * | 9/2022 | Tassinari | E02D 7/10 |
| 2023/0407666 A1 * | 12/2023 | Tassinari | E02D 15/08 |
| 2024/0110354 A1 * | 4/2024 | Smith | E02B 8/085 |

* cited by examiner

*Primary Examiner* — Carib A Oquendo
(74) *Attorney, Agent, or Firm* — Finch & Maloney PLLC

(57) ABSTRACT

A mast and grapple combination includes a mast and a grapple. The mast has a first end (lower end) and a second end (upper end). A carriage travels along the mast from the first end toward the second end. The grapple is carried by the carriage. The grapple has jaws which open and close, and is mounted for rotation about a transverse axis relative to the carriage. A jaw drive mechanism controls operation of the jaws, such that the jaws are movable to an open position to receive a pile and a closed position to grip the pile. A jaw orientation drive mechanism controls rotation of the jaws about the transverse axis, thereby changing the orientation of the jaws and, consequently, the orientation of the pile gripped by the jaws relative to the mast.

6 Claims, 8 Drawing Sheets

MAST AND GRAPPLE COMBINATION

FIELD

There is described a mast and grapple combination. This combination was developed to pick up and position a pile, prior to the pile being driven by a pile driver, but the combination has wider application.

BACKGROUND

Prior to a pile being driven by a pile driver, the pile must be picked up and moved into position. Piles are currently being picked up and positioned by rigging cables and using hoists.

SUMMARY

There is provided a mast and grapple combination, which includes a mast and a grapple. The mast with a first end (lower end) and a second end (upper end). A carriage travels along the mast from the first end toward the second end. The grapple is carried by the carriage. The grapple has jaws which open and close, and is mounted for rotation about a transverse axis relative to the carriage. A jaw drive mechanism controls operation of the jaws, such that the jaws are movable to an open position to receive a pile and a closed position to grip the pile. A jaw orientation drive mechanism controls rotation of the jaws about the transverse axis, thereby changing the orientation of the jaws and, consequently, the orientation of the pile gripped by the jaws relative to the mast.

The mast and grapple combination, as described above, by operation of the draw drive mechanism is capable of opening the jaws to receive a pile which is in a substantially horizontal position on a ground surface and then closing the jaws to grip the pile. Movement of the carriage toward the second end of the mast raises the pile. Operation of the jaw orientation drive mechanism rotates the jaws until the pile held by the jaws is in a vertical orientation in preparation for being driven into the ground.

Although beneficial results may be obtained with only those features described above, when the pile is in a vertical orientation, it is preferable to be able to position the pile to the left side or to the right side of the mast. To achieve this, it is preferred that the grapple is secured to a mounting plate which is pivotally mounted to the carriage for pivotal movement about a pivot axis which is parallel to the axis of the mast. A grapple pivotal orientation drive mechanism pivots the mounting plate enabling the grapple to be selectively pivoted to a first side (left side) or to a second side (right side) of the mast.

Although beneficial results may be obtained with only those features described above, it is desirable to centre the pile within the jaws. To achieve this, it is preferred that an extendible and retractable centralizer arm is positioned within a space enclosed by the jaws. A centralizer arm drive mechanism selectively extends and retracts the centralizer arm, such that the centralizer arm is extended to press the pile against the jaws, thereby centralizing the pile within the space enclosed by the jaws.

Although beneficial results may be obtained with only those features described above, it is desirable to control a remote end of the pile, which is remote from jaws of the grapple. To achieve this, it is preferred that the mast have pile stabilizing arms pivotally secured to the mast toward the first end with pile grippers positioned at a remote end of each of the arms. A stabilizing arms drive mechanism is used to pivot the arms to selectively bring the pile grippers into engagement with the remote end of the pile.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

There will now be described a mast and grapple combination, generally identified by numeral 10, with reference to FIG. 1 through FIG. 8.

Figure 1:
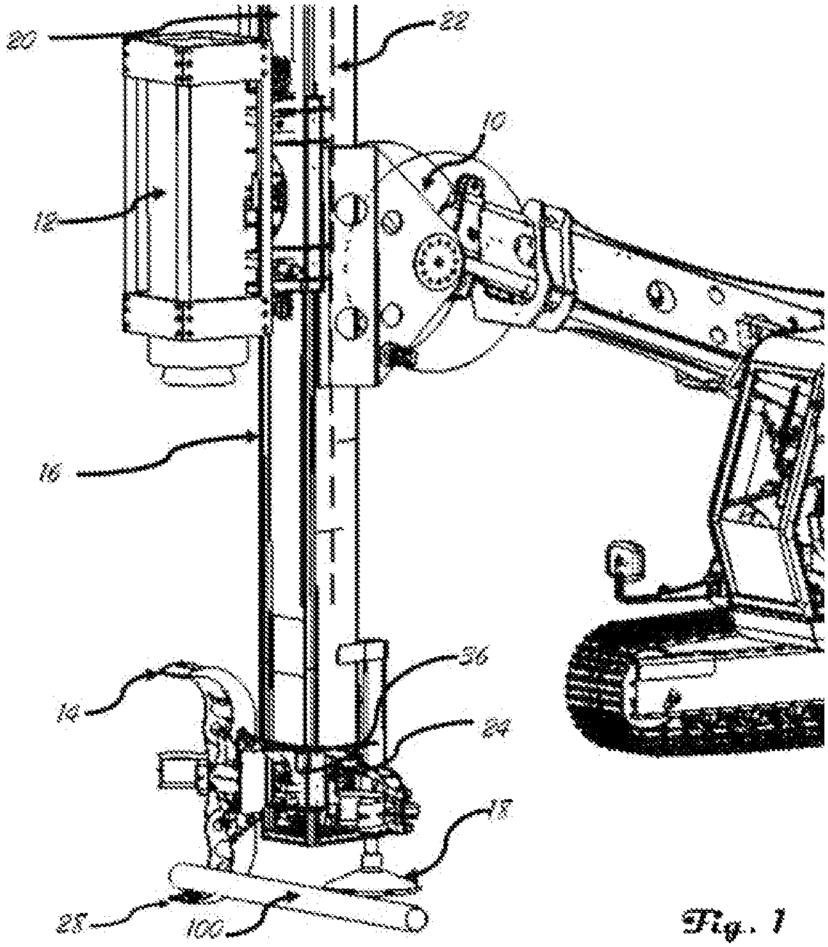
FIG. 1 is a perspective view of the mast and grapple combination showing the jaws in a horizontal orientation and an open position to receive a pile, with the carriage positioned toward the first end of the mast.

Structure:

Referring to FIG. 1, a pile driver 12 has been selected to illustrate the utility of mast and grapple combination 10. Mast and grapple combination 10 as shown includes a grapple 14 and a mast 16.

Referring to FIG. 1, pile driver 12 has a mast 16 with a first end 18 (lower end), a second end 20 (upper end) and a longitudinal axis indicated by broken lines 22 that extends between first end 18 and second end 20. A carriage 24 travels along mast 16 from first end 18 toward second end 20.

Figure 2:
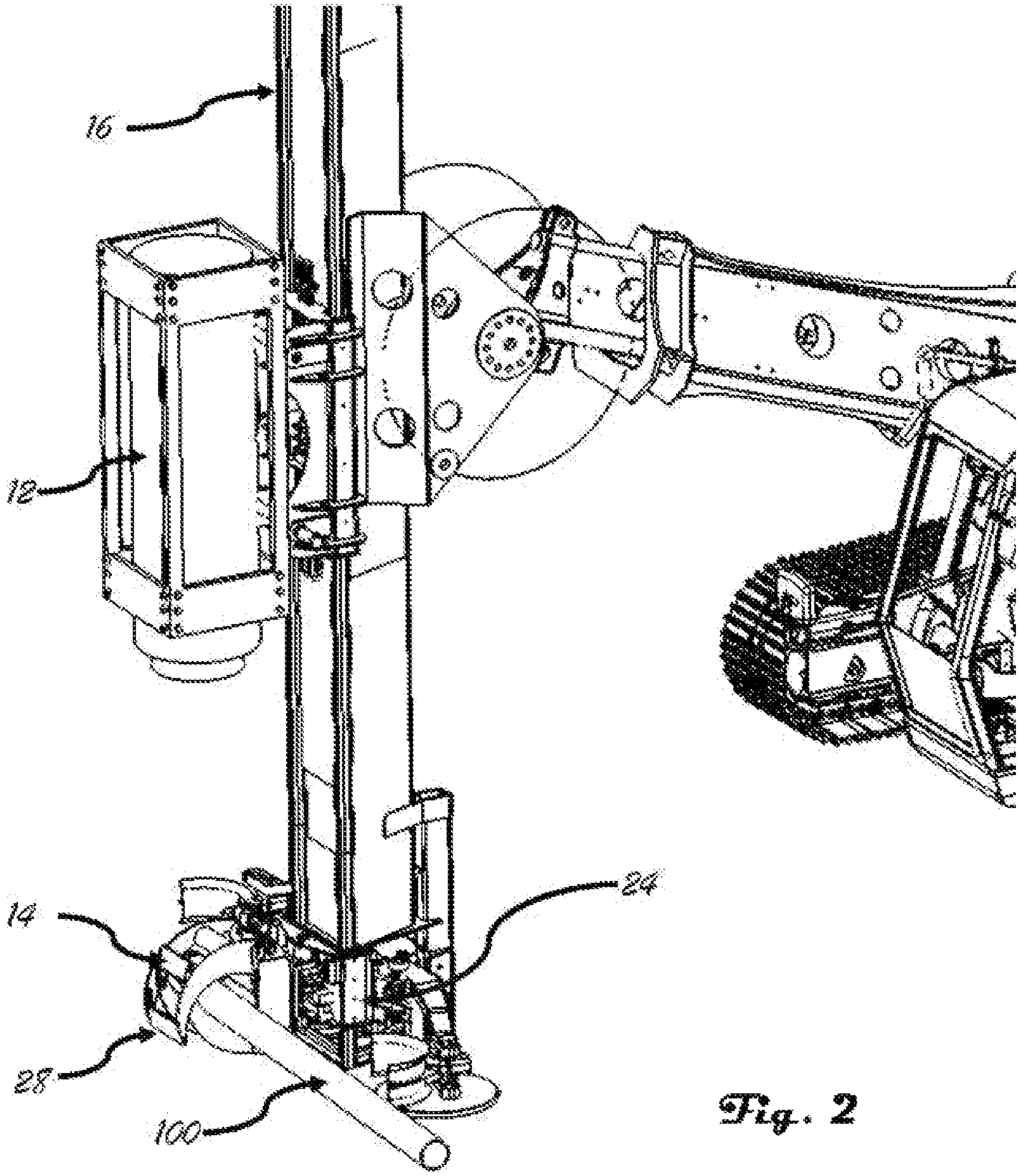
FIG. 2 is a perspective view of the mast and grapple combination of FIG. 1, showing the jaws in a closed position to grip the pile.
Figure 6:
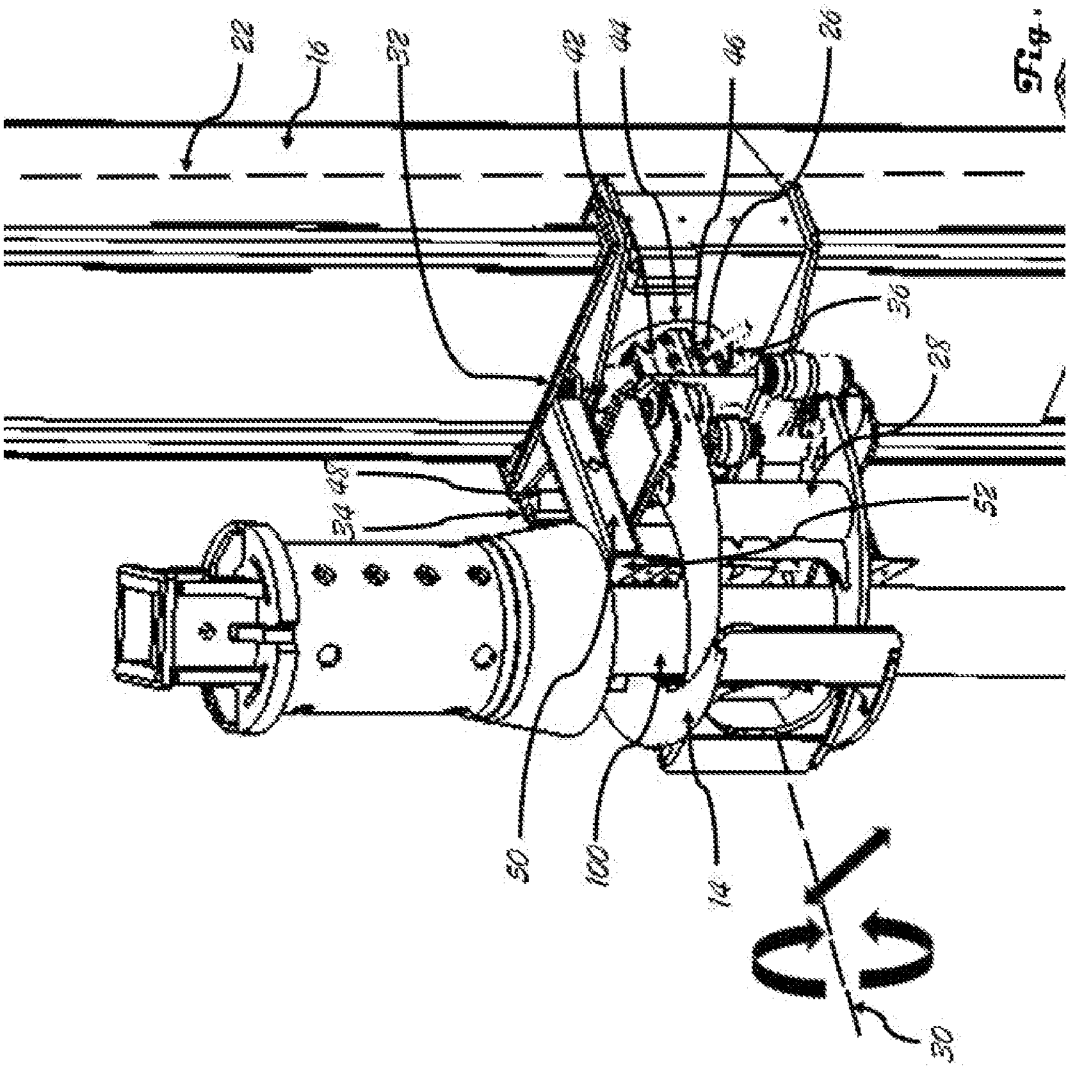
FIG. 6 is a detailed perspective view of the mast and grapple combination showing the mounting of the grapple to the carriage.

Referring to FIG. 6, grapple 14 is carried by a mounting plate 26 on carriage 24. Grapple 14 has jaws 28 which open (as best shown in FIG. 1) and close to engage a pile 100 (as shown in FIG. 2). Referring to FIG. 6, grapple 14 is mounted for rotation about a transverse axis indicated by broken lines 30 relative to mounting plate 26 on carriage 24. Referring to FIG. 6, mounting plate 26 is pivotally mounted to carriage 24 for pivotal movement about a pivot axis parallel to longitudinal axis 22 of mast 16, established by pivot pin 32.

Referring to FIG. 6, carriage 24 is driven by cable linkages 34, which cause carriage 24 to move up and down mast 16.

A hydraulic reservoir is provided (not shown), which provides hydraulic fluid to power jaws 28. A hydraulic jaw drive mechanism controls the opening and closing of jaws 28. This enables jaws 28 to be moved from an open position to receive pile 100 as illustrated in FIG. 1 to a closed position to grip pile 100, as illustrated in FIG. 2.

Figure 3:
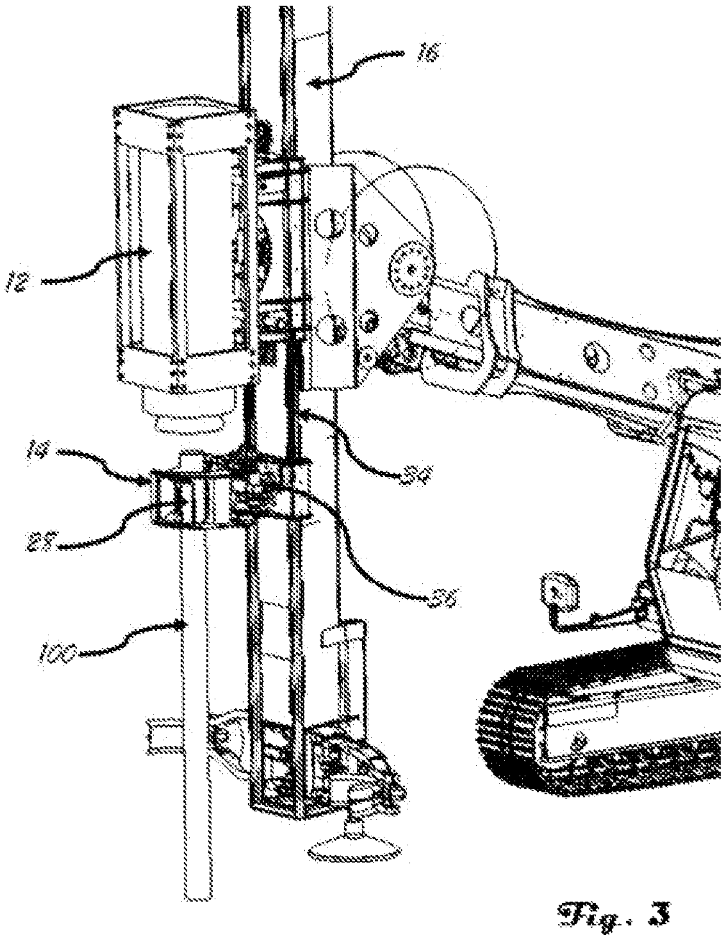
FIG. 3 is a perspective view of the mast and grapple combination of FIG. 2 showing with the carriage travelling along the mast from the first end toward the second end and the jaws rotated to position the pile in a vertical orientation.
Figure 4:
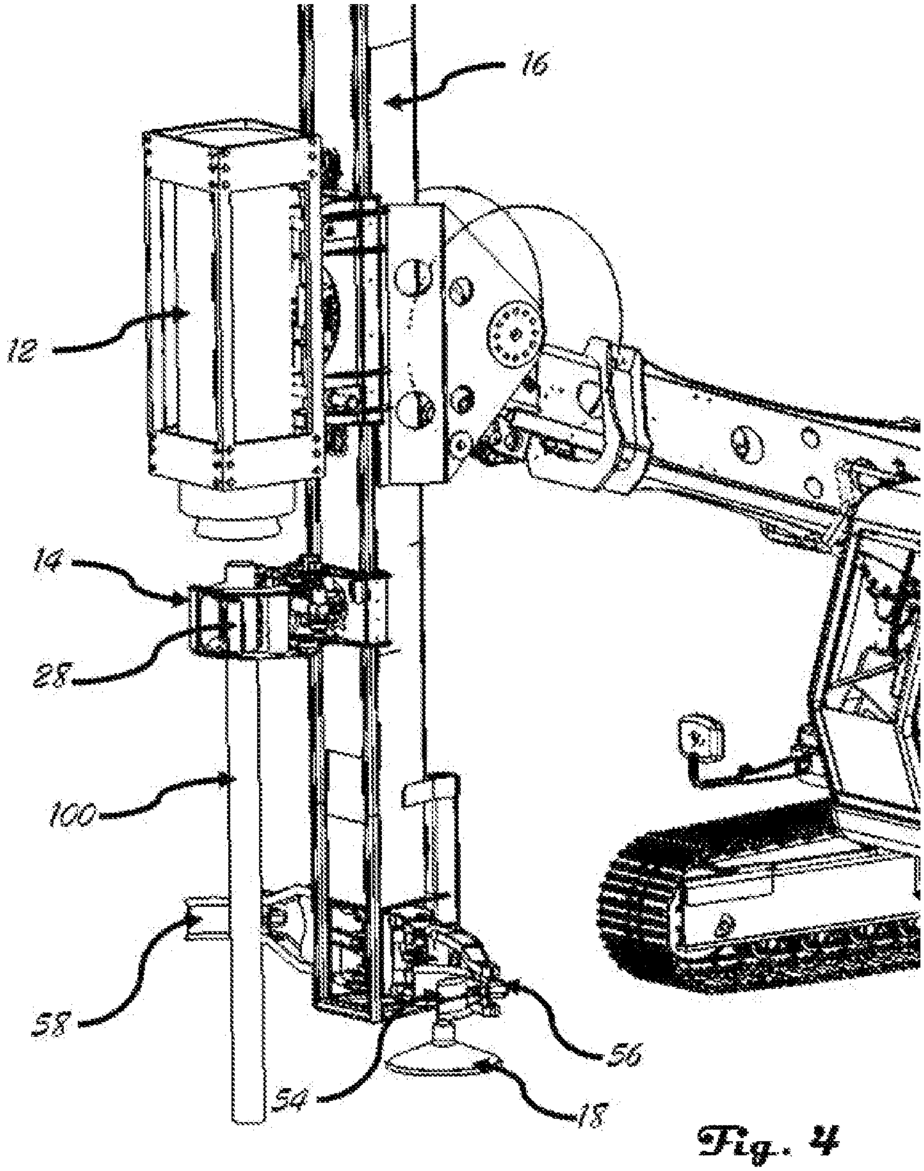
FIG. 4 is a perspective view of the mast and grapple combination of FIG. 3 showing the pile stabilizing arms in an open position.
Figure 5:
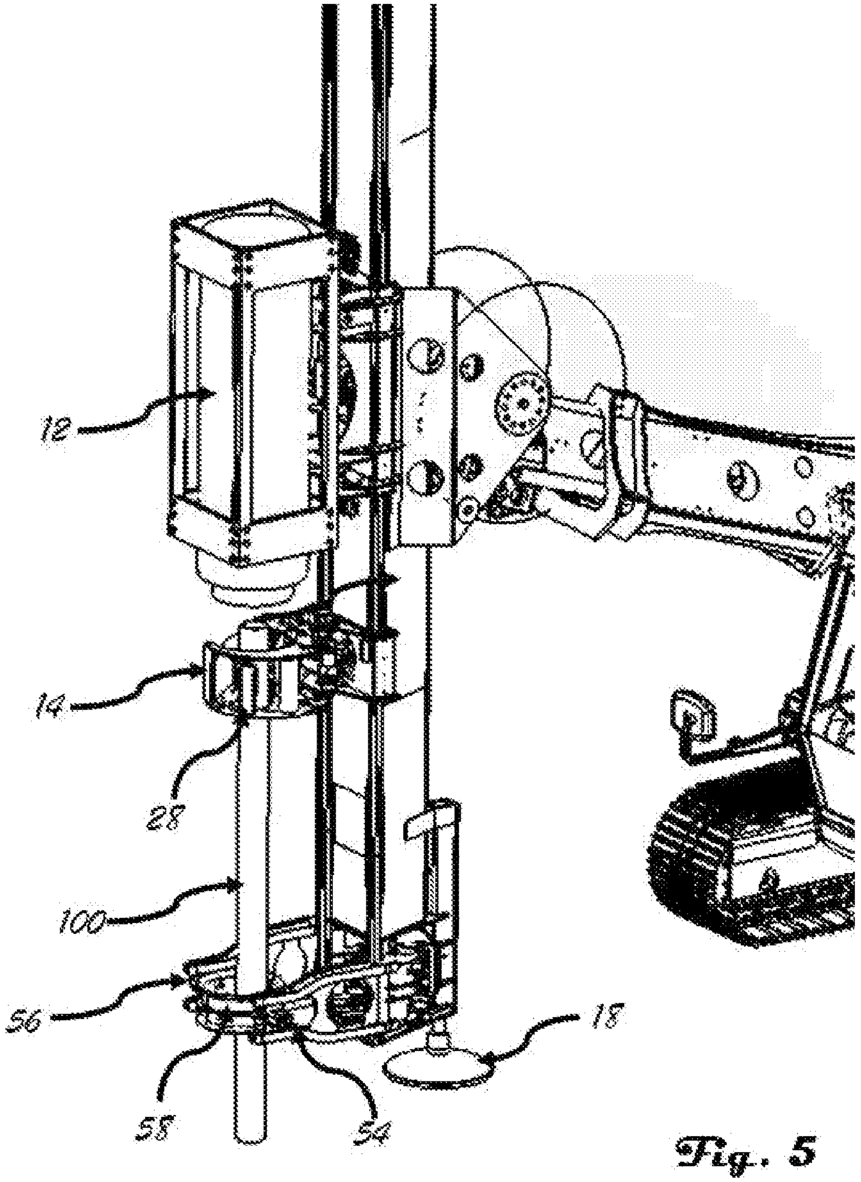
FIG. 5 is a perspective view of the mast and grapple combination of FIG. 4 showing the stabilizing arms in a closed position with the pile grippers in engagement with the pile.

Referring to FIG. 6, a hydraulic motor 36 serves as a hydraulic jaw orientation drive mechanism which rotates jaws 28 about transverse axis 30 thereby changing the orientation of jaws 28 and, consequently, the orientation of pile 100 gripped by jaws 28 relative to longitudinal axis 22 of mast 16. Referring to FIG. 1 and FIG. 2 jaws 28 are positioned in an orientation to hold pile 100 in a horizontal orientation. Referring to FIG. 3 through FIG. 5, jaws 28 are positioned to hold pile 100 in a vertical orientation.

Figure 7:
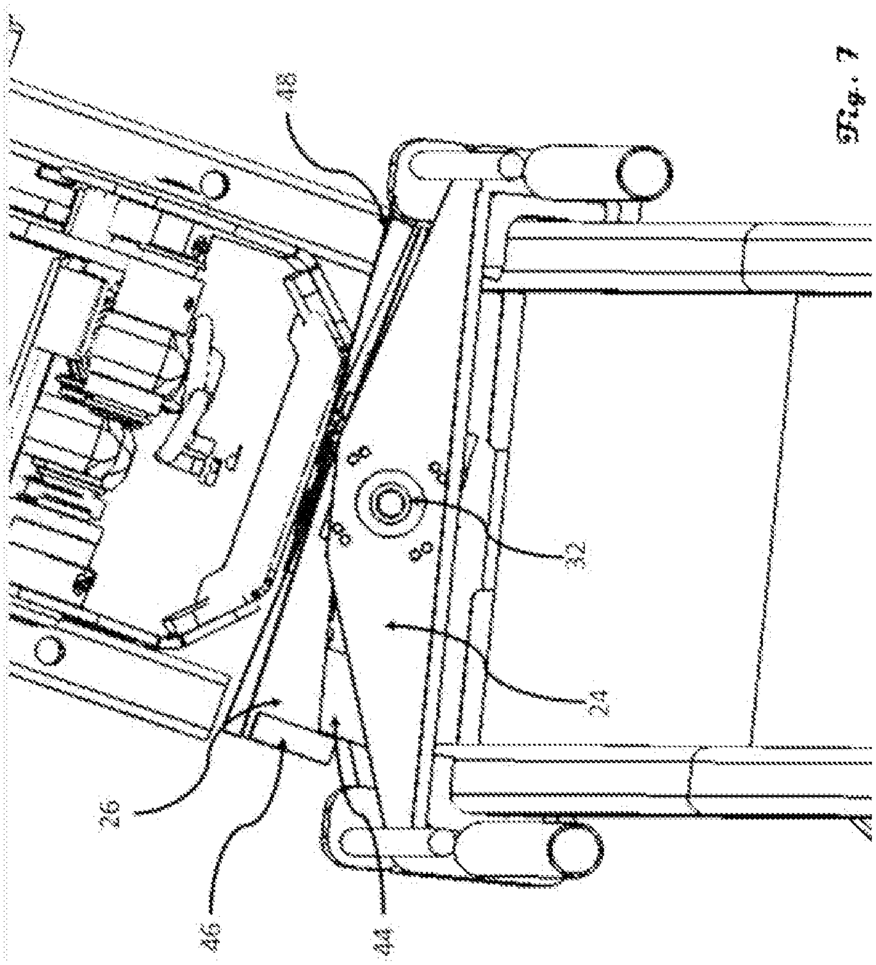
FIG. 7 is a top plan view of the mast and grapple combination showing the mounting plate pivoted toward the second side of the mounting plate.
Figure 8:
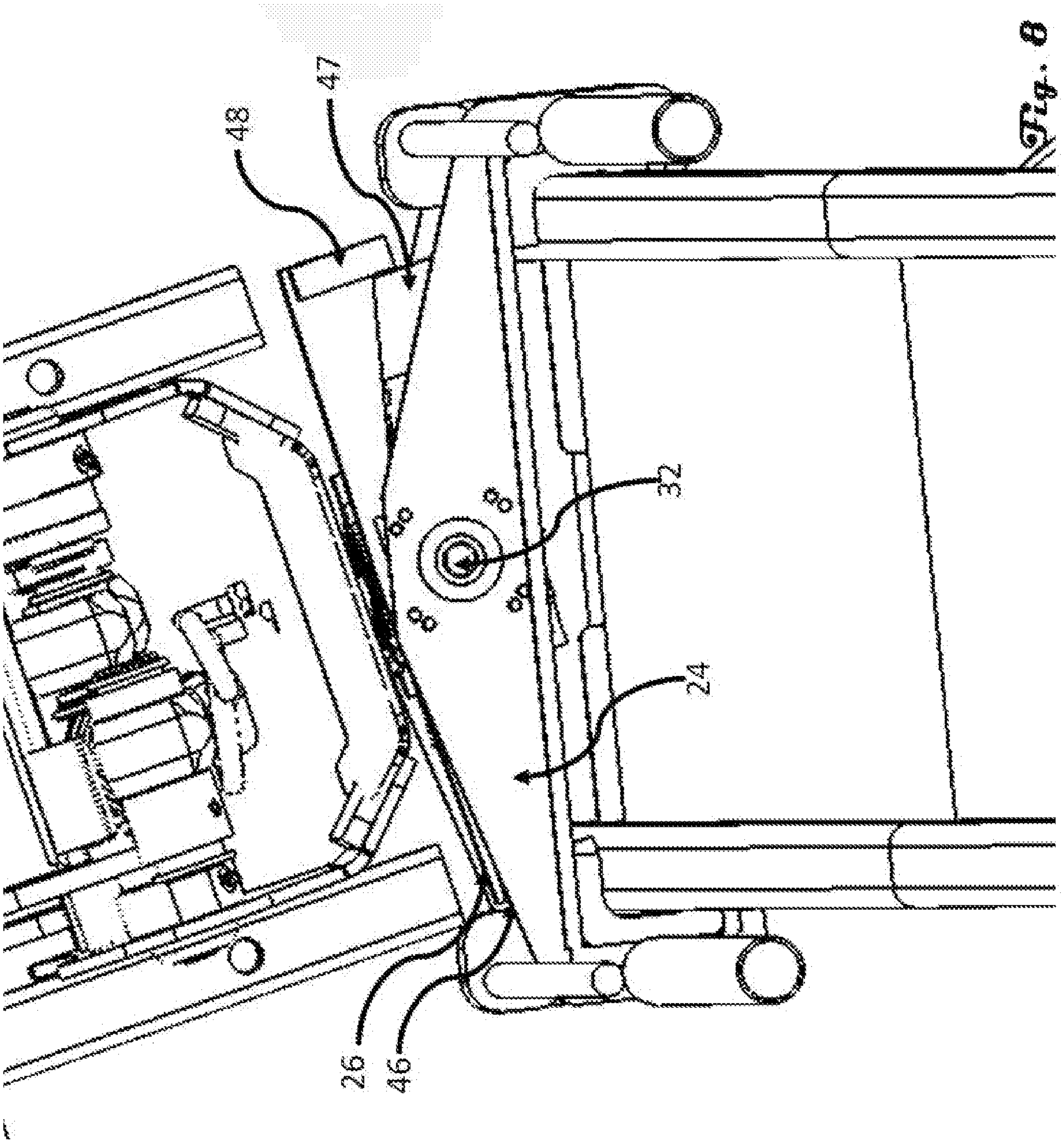
FIG. 8 is a top plan view of the mast and grapple combination showing the mounting plate pivoted toward the first side of the mounting plate.

Referring to FIG. 6, an air driven grapple pivotal orientation drive mechanism, generally identified by reference numeral 42 pivots mounting plate 26 about the pivot axis provided by pivot pin 32, thereby enabling grapple 14 to be selectively pivoted to a first side or to a second side of mast 16. Referring to FIG. 7, air driven grapple pivotal orientation drive mechanism 42 includes a first side expandable bag 44 positioned behind a first side 46 of mounting plate 26. Referring to FIG. 8, there is a second side expandable bag 47 behind a second side 48 of mounting plate 26. First side expandable bag 44 and the second side expandable bag 47 are coupled to an air source. Referring to FIG. 7, mounting plate 26 is pivoted about pivot pin 32 toward second side 48 by supplying air to expand the first side expandable bag 44, while allowing the second side expandable bag 47 to collapse. Referring to FIG. 8, mounting plate 26 is pivoted about pivot pin 32 toward first side 46 by supplying air to expand the second side expandable bag 47, while allowing first side expandable bag 44 to collapse.

Referring to FIG. 6, an extendible and retractable centralizer arm 50 is positioned within a space 52 enclosed by jaws 28. The hydraulic reservoir (previously described but not shown), which provides hydraulic fluid to a hydraulic centralizer arm drive mechanism that is capable of selectively extending and retracting centralizer arm 50. This enables an operator to extend centralizer arm 50 to press pile 100 against jaws 28, thereby centralizing pile 100 within space 52 enclosed by jaws 28.

Referring to FIG. 4 and FIG. 5, mast 16 has pile stabilizing arms 54 and 56 pivotally secured to mast 16 toward first end 18. Pile grippers 58 are positioned at a remote end of each of arms 54 and 56. The hydraulic reservoir (previously described but not shown), which provides hydraulic fluid to a hydraulic stabilizing arms drive mechanism which pivots arms 54 and 56 from the position shown in FIG. 4 to the position shown in FIG. 5 to selectively bring pile grippers 58 into engagement with pile 100.

Operation:

Referring to FIG. 1, carriage 24 is lowered to first end 18 of mast 16. Hydraulic motor 36 is used to rotate jaws 28 in preparation for picking up pile 100. The hydraulic jaw drive mechanism moves jaws 28 to the open position to receive pile 100. Pile driver 12 is driven forward to position pile 100 within jaws 28.

Referring to FIG. 2, the hydraulic jaw drive mechanism moves jaws 28 to the closed position to grip pile 100.

Referring to FIG. 6, extendible and retractable centralizer arm 50 is extended to press pile 100 against jaws 28, thereby centralizing pile 100 within space 52 enclosed by jaws 28.

Referring to FIG. 3, cable linkages 34, are used to move carriage 24 to move up mast 16, toward second end 20. Hydraulic motor 36 rotates jaws 28 about transverse axis 30 thereby changing the orientation of jaws 28 until pile 100 is in a vertical orientation.

Referring to FIG. 4 and FIG. 5, the hydraulic stabilizing arms drive mechanism pivots arms 54 and 56 from the position shown in FIG. 4 to the position shown in FIG. 5 to selectively bring pile grippers 58 into engagement with pile 100.

Referring to FIG. 6, if desired, air driven grapple pivotal orientation drive mechanism 42 may be used to position pile 100 to one side or the other side of mast 16. This positioning is accomplished by pivoting mounting plate 26 about pivot pin 32. For example, referring to FIG. 7, to position pile 100 toward second side, air is supplied to expand the first side expandable bag 44, while allowing the second side expandable bag 47 to collapse. For example, referring to FIG. 8, to position pile 100 toward first side, air is supplied to expand the second side expandable bag 47, while allowing the first side expandable bag 44 to collapse.

Mast and grapple combination 10 provides a safer way to handle piles than is provided by hoisting and rigging currently in use. It can be used on any equipment that has a mast 16 upon which carriage 24 can travel. It can grip piles having a variety of cross-sectional shapes, round, square, or otherwise. It can grip piles having a variety of diameters from 2 inches through 16 inches. The amount of gripping force can be adjusted by use of hydraulics.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A mast and grapple combination, comprising:

a mast having a first end and a second end;

a carriage that travels along the mast from the first end toward the second end;

a grapple carried by the carriage, the grapple having jaws which open and close, the grapple being mounted for rotation about a transverse axis relative to the carriage, a jaw drive mechanism controlling the jaws, such that the jaws are movable to an open position to receive a pile and a closed position to grip the pile; and a jaw orientation drive mechanism, to rotate the jaws about the transverse axis thereby changing the orientation of the jaws and, consequently, the orientation of the pile gripped by the jaws relative to the mast, wherein an extendible and retractable centralizer arm is positioned within a space enclosed by the jaws, a centralizer arm drive mechanism selectively extends and retracts the centralizer arm, such that the centralizer arm is extended to press the pile against the jaws, thereby centralizing the pile within the space enclosed by the jaws.

2. The combination of claim 1, wherein the grapple is secured to a mounting plate which is pivotally mounted to the carriage for pivotal movement about a pivot axis which is parallel to the axis of the mast, and a grapple pivotal orientation drive mechanism pivots the mounting plate enabling the grapple to be selectively pivoted to a first side or to a second side of the mast.

3. The combination of claim 1, wherein the mast has pile stabilizing arms pivotally secured to the mast toward the first end and pile grippers positioned at a remote end of each of the arms, a stabilizing arms drive mechanism being provided to pivot the arms to selectively bring the pile grippers into engagement with the pile.

4. A mast and grapple combination, comprising:

a mast having a first end, a second end and a longitudinal axis that extends between the first end and the second end;

a carriage that travels along the mast from the first end toward the second end;

a grapple carried by a mounting plate on the carriage, the grapple having jaws which open and close, the grapple being mounted for rotation about a transverse axis relative to the mounting plate on the carriage, the mounting plate being pivotally mounted to the carriage for pivotal movement about a pivot axis parallel to the longitudinal axis of the mast, a jaw drive mechanism controlling the jaws, such that the jaws are movable to an open position to receive a pile and a closed position to grip the pile; and a jaw orientation drive mechanism, to rotate the jaws about the transverse axis thereby changing the orientation of the jaws and, consequently, the orientation of the pile gripped by the jaws relative to the longitudinal axis of the mast, a grapple pivotal orientation drive mechanism to pivot the mounting plate about the pivot axis, thereby enabling the grapple to be selectively pivoted to a first side or to a second side of the mast, an extendible and retractable centralizer arm positioned within a space enclosed by the jaws;

a centralizer arm drive mechanism selectively extending and retracting the centralizer arm, such that the centralizer arm is extended to press the pile against the jaws, thereby centralizing the pile within the space enclosed by the jaws.

5. The combination of claim 4, wherein the mast has pile stabilizing arms pivotally secured to the mast toward the first end, and pile grippers positioned at a remote end of each of the arms, a stabilizing arms drive mechanism being provided to pivot the arms to selectively bring the pile grippers into engagement with the pile.

6. The Combination of claim 4, wherein the grapple pivotal orientation drive mechanism to pivot the mounting plate is comprised of a first side expandable bag behind a first side of the mounting plate and a second side expandable bag behind a second side of the mounting plate, the first side expandable bag and the second side expandable bag being coupled to a fluid source, the mounting plate being pivoted about the pivot axis toward the second side by supplying fluid to expand the first side expandable bag, the mounting plate being pivoted about the pivot axis toward the first side by supplying fluid to expand the second side expandable bag.

* * * * *